United States Patent [19]

Wade

[11] 4,130,753
[45] Dec. 19, 1978

[54] CONTROL SYSTEMS

[75] Inventor: Kenneth R. Wade, Parbold, England

[73] Assignee: Pactrol Controls Limited, England

[21] Appl. No.: 704,891

[22] Filed: Jul. 13, 1976

[30] Foreign Application Priority Data

Jul. 15, 1975 [GB] United Kingdom ............... 29537/75

[51] Int. Cl.² ............................................. H05B 1/02
[52] U.S. Cl. ................................................. 219/492
[58] Field of Search ............... 219/490, 494, 497, 499, 219/501, 492, 341, 360

[56] References Cited

U.S. PATENT DOCUMENTS

| | | | |
|---|---|---|---|
| 3,566,079 | 2/1971 | O'Neill | 219/501 |
| 3,571,564 | 3/1971 | Welch | 219/501 |
| 3,891,817 | 6/1975 | Brown | 219/341 |
| 3,968,346 | 7/1976 | Cooksley | 219/341 |

*Primary Examiner*—J. V. Truhe
*Assistant Examiner*—Fred E. Bell
*Attorney, Agent, or Firm*—Beveridge, De Grandi, Kline & Lunsford

[57] ABSTRACT

This invention relates to a control system which comprises a sensor for monitoring a selected variable and providing an electrical signal which is a function of said variable; a reference source operable to provide a reference at an output thereof which varies over a predetermined time period; and a comparator circuit coupled to the sensor and the reference voltage source. The comparator circuit compares the electrical signal with said reference signal and provides a control signal in dependence upon the comparison.

28 Claims, 14 Drawing Figures

FIG 1

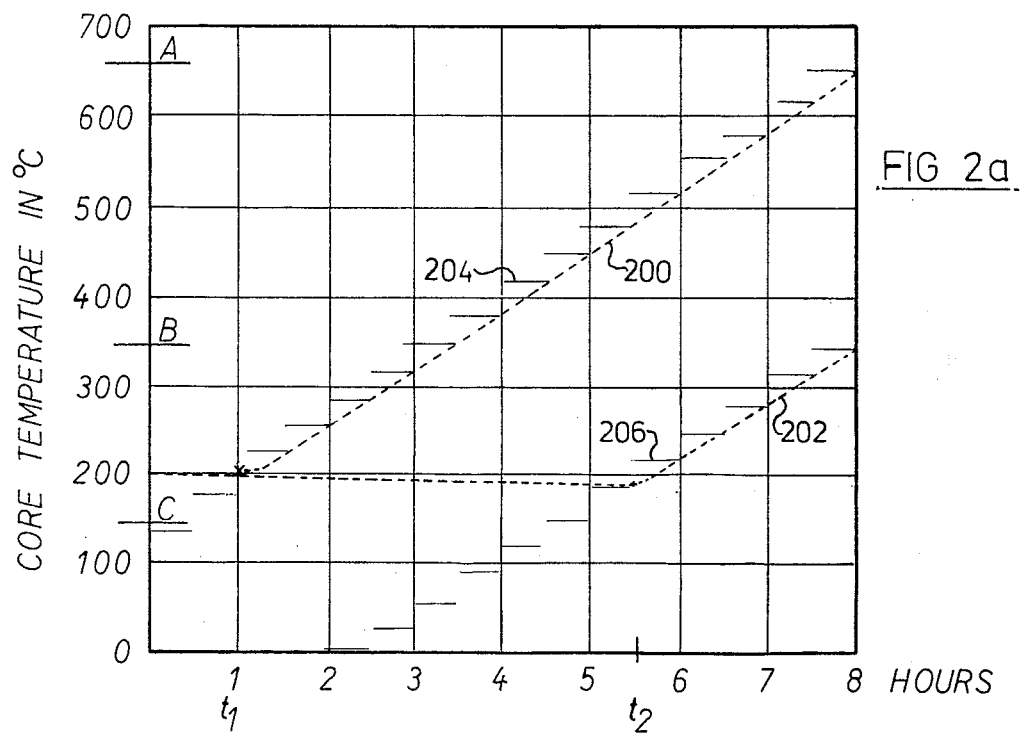
FIG 2a.
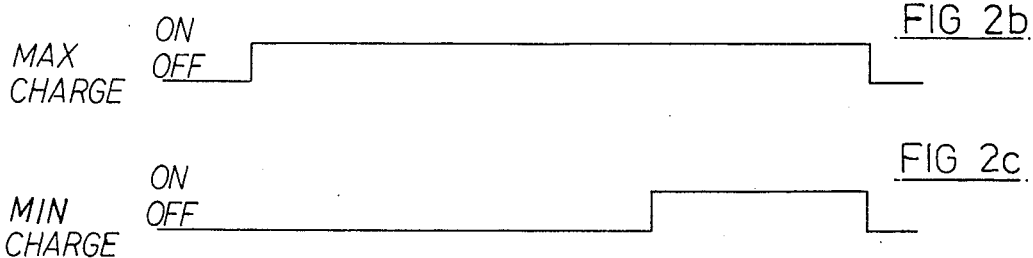
FIG 2b.
FIG 2c.
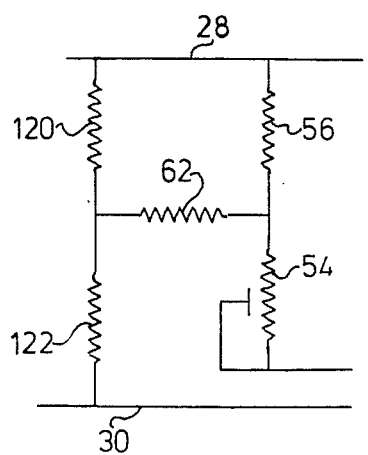
FIG 3
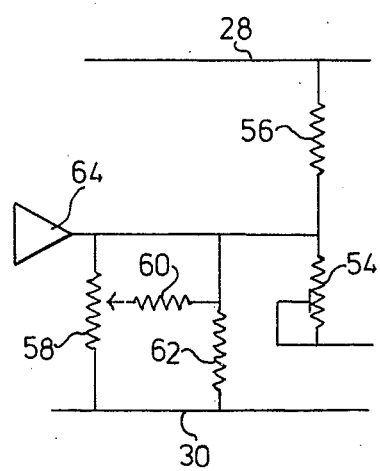
FIG 4

CONTROL SYSTEMS

The present invention relates to control systems, and particularly to control systems for controlling the operation of storage heaters in dependence upon the temperature of the storage medium of the heaters.

An electric storage heater e.g. a radiator, fan radiator, warm air system or water heater is generally connected into a domestic electricity supply in such a way as to take advantage of reduced electricity costs during "off peak" hours. During this period the control system of the heater switches the latter on and off to maintain the storage medium at a required temperature. One disadvantage with this control system is that the heater is switched on immediately the "off peak" period commences. This results in a sudden large loading of the supply when all such heaters come into operation.

An object of the present invention is to provide an improved control system which is suitable for use with storage heaters.

Accordingly the present invention provides a control system comprising a sensor for monitoring a selected variable and providing an electrical signal which is a function of said variable; a reference source operable to provide a reference signal at an output thereof which varies over a predetermined time period; and a comparator circuit coupled to the sensor and the reference source and operable to compare said electrical signal with said reference signal and provide a control signal in dependence upon the comparison.

Preferably the selected variable is the temperature of storage medium of a storage heater, in which case the sensor may be a thermocouple, and the comparator circuit is arranged to control a charging circuit of the storage heater by means of said control signal.

In one embodiment the reference source includes both a timing circuit operable to provide a timing signal which varies in a step-wise manner over said predetermined time period and control means for providing a further electrical signal, the reference signal being a function of both the further electrical signal and the timing signal. Advantageously the control means is operable to vary the mean rate of increase of the reference signal by varying the height of each step of the reference signal. Alternatively the control means adjusts the level of the reference signal within a preset voltage range.

The control means may be manually adjustable to vary said further electrical signal, or in the form of a sensor, for example a temperature dependant resistor, for monitoring a second selected variable such as ambient temperature and providing said further electrical signal as a function of said second selected variable.

In a further embodiment the comparator circuit comprises comparator means having two inputs, the first of which is connected to the first sensor and the second of which is connected to the output of the reference source. The comparator means is operable to generate the control signal in dependence upon the difference between electrical signals at its two inputs.

Advantageously the comparator circuit also includes switch means, for example a silicon-controlled rectifier, switchable from a first to a second switched state by the comparator means responsively to the reference signal exceeding the first-mentioned electrical signal. The switch means may control the charging circuit of the heater.

The present invention is further described hereinafter, by way of example, with reference to the accompanying drawings, in which:

FIG. 1 is a circuit diagram of a control system according to the present invention;

FIGS. 2a, 2b and 2c illustrate the operation of the system of FIG. 1;

FIG. 3 is a circuit modification for the system of FIG. 1;

FIG. 4 is a further circuit modification for the system of FIG. 1;

Figure 1:
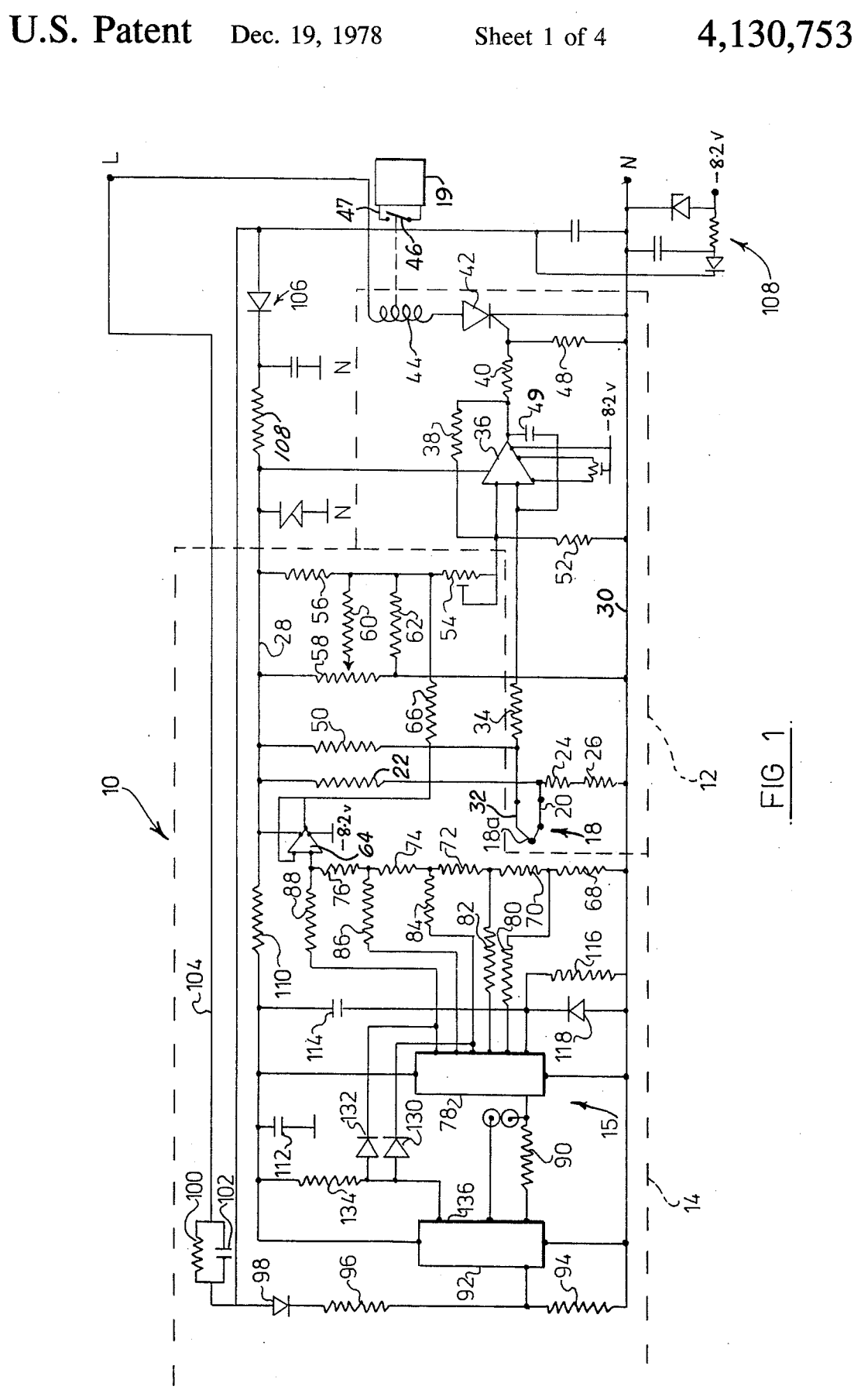
Figure 5A:
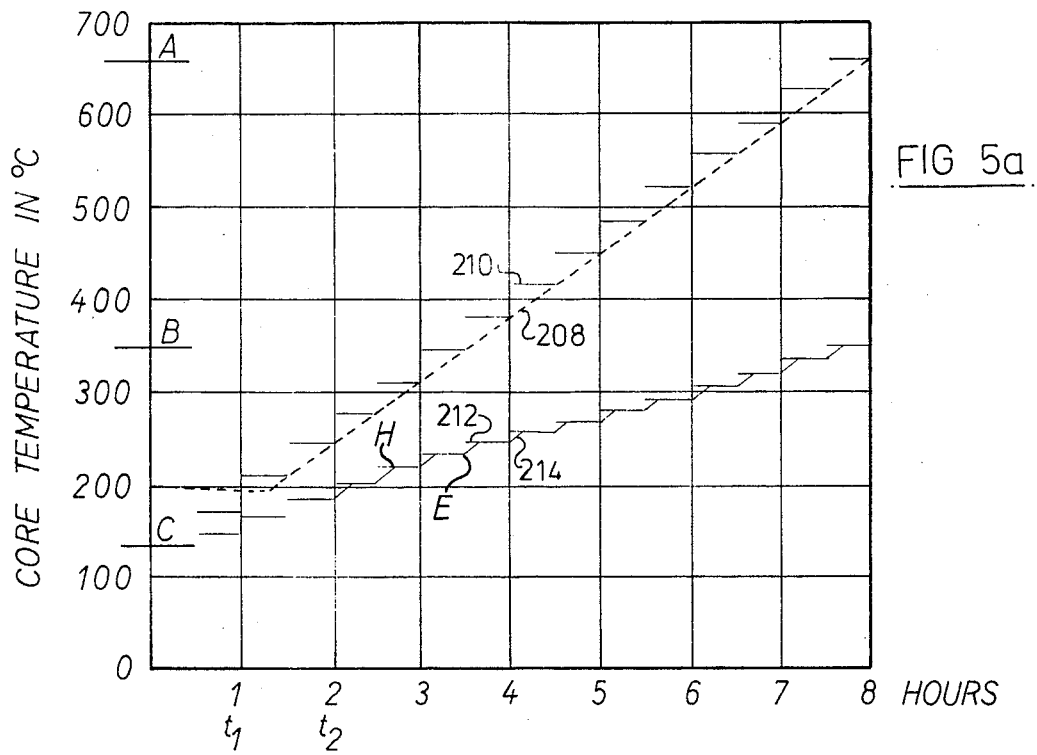
FIGS. 5a, 5b and 5c illustrate the operation of the system of FIG. 1 incorporating the circuit modification of FIG. 4.

The control system 10 of FIG. 1 comprises a sensor and comparator circuit 12, a voltage reference source 14 including a timing circuit 15 for the comparator circuit, and a power supply circuit.

Considering firstly the circuit 12, this includes a sensor 18 in the form of a thermocouple, for example a nickel chrome/nickel aluminium thermocouple, whose "hot" junction 18a is located on or in the storage medium of, for example, a storage heater 19 and measures the so-called core temperature, that is the storage medium temperature. One wire 20 of the thermocouple 18 is connected to the junction of a resistor 22 and a series combination of a resistor 24 and a coil 26, the resistors 24 and 22 and coil 26 being series connected across positive and neutral supply voltage lines 29 and 30. The coil 26 is a copper wire coil of low resistance and high positive temperature coefficient and compensates for variations in ambient temperature conditions.

The second wire 32 of the thermocouple 18 is connected via a resistor 34 to the inverting input of an operational amplifier 36 whose non-inverting input is connected to a voltage reference source. The output of the amplifier 36 is connected to its non-inverting input via a resistor 38 which provides some hysteresis in the switching action of the amplifier. The output is also connected via a resistor 40 to the gate of a thyristor 42 (SCR) connected in an a.c. power supply circuit of a solenoid 44 of an a.c. relay whose normally open contacts 46 are connected in a charging power supply circuit 47 of the heater. The gate of the SCR 42 is connected to the neutral line 30 via a resistor 48.

In operation, a voltage equal to the voltage generated by the thermocouple 18 plus the voltage across the coil 26 and resistor 24 is compard by the amplifier 36 with a reference voltage from the reference voltage source and the conductive state of the SCR 42 altered accordingly. When the reference voltage is greater than the voltage at the inverting input, the amplifier 36 fires the SCR 42 to energise the relay and close the contacts 46 and thus energise the heater charging circuit. The storage medium in the heater is thus charged (i.e. heated) to the required temperature, that set by the value of the reference voltage.

When the voltage at the inverting input rises above the reference voltage the output of the amplifier 36 goes negative, thus removing the firing voltage from the gate of the SCR 42. The SCR 42 then becomes non-conductive when the instantaneous a.c. voltage applied across it drops to zero, and the contacts 46 open to switch off the heater charging circuit.

Capacitor 49 provides frequency selective negative feedback to reduce the effects of stray signals on the SCR 42. A resistor 50 connects the thermocouple wire 32 to the supply line 28 to ensure that if the thermocouple goes open circuit the heater charging circuit is permanently switched off.

The reference voltage source includes a potential divider formed by resistor 52, 54 and 56 connected across the supply lines 28 and 30, the junction of resistors 52 and 54 being connected to the non-inverting input of the amplifier 36 and the junction of resistors 54 and 56 being connected to the neutral line 30 by way of a resistor 62. The reference voltage source also includes a variable resistor 58 which is connected across the lines 28 and 30 and whose slider is connected to the junction of the resistors 54 and 56 by a resistor 60. The variable resistor 58 serves as a manual control and enables the desired temperature of the storage medium to be preset; the values of the resistors 52 and 56 are chosen such that, with the resistor 58 set at a minimum, the voltage at the non-inverting input of the amplifier 36 represents a minimum setting for the desired temperature of the storage medium. Adjusting the resistor 58 displaces upwards or downwards the voltage range over which the reference voltage is varied by the timing circuit.

The preset resistor 54 provides fine adjustment of a maximum setting for the desired temperature of the storage medium.

The reference voltage is automatically adjusted during operation of the control system by the timing circuit 14 which includes an operational amplifier 64 whose output is connected to the junction of the resistors 54 and 56 by way of a resistor 66, and is connected directly to its own inverting input. The non-inverting input of the amplifier 64 is connected to the line 30 by a chain of resistors 68 to 76 whose junctions are connected to respective outputs of a binary counter 78 of the timing circuit by resistors 80 to 88. The amplifier 64 serves mainly as a buffer between the counter 78 and the comparator circuit.

A clock input of the counter 78 is connected by a resistor 90 to an output of a second binary counter 92 whose clock input is connected to a pulse source by way of a voltage divider consisting of resistors 94 and 96. The counters 78 and 92 form a counting circuit of the timing circuit.

The pulse source comprises a diode 98 and a parallel combination of a resistor 100 and capacitor 102 connected in series in a 220/240 v. mains line 104 of the power supply circuit for the system.

Low voltage positive and negative d.c. supplies for the comparator and timing circuits are derived from the line 104 by rectifying and clamping circuits 106, 108 of the power supply circuit, a further resistor 110 and smoothing capacitor 112 being provided in the line 28 to the counters 78 and 92.

The operation of the control system will be described initially with reference to FIG. 2a which plots the storage medium temperature against time during the "off peak" hours. The broken curves 200 and 202 show the variation in storage medium temperature with time, during a so-called proportioning period, for the variable resistor 58 set respectively at its maximum and minimum setting. A proportioning period is the period over which the voltage at the non-inverting input of the amplifier 36 steps from its minimum to maximum values. The stepped curves 204 and 206 illustrate the variation with time in the voltage at the non-inverting input of the amplifier 36 as an equivalent desired storage medium temperature. FIGS. 2b and 2c show the heater charging time durations respectively for the curves 200 and 202.

When the control system is initially switched on at the start of the "off peak" period, the outputs of the counter 78 are all at zero voltage. The output of the amplifier 64 is therefore at zero, effectively setting the reference voltage at the non-inverting input of the amplifier 36 at the minimum setting preset by the setting of the resistor 58. If the temperature of the storage medium is lower than the minimum temperature setting (i.e. lower than t1 for curve 204) the amplifier 36 fires the SCR 42 to switch on the heater charging circuit. However, if the temperature of the storage medium is higher than the minimum temperature setting the heating charging circuit remains off. This latter case is illustrated in FIG. 2a where the storage medium temperature is initially at 200° C. As the "off peak" period progresses the counter 92 counts the succession of pulses applied thereto and for every preset number of input pulses applies a pulse to the input of the counter 78 which in turn counts the applied pulses and energises its output to apply a progressively more positive voltage to the non-inverting input of the amplifier 64. The output of the latter thus progressively goes more positive, raising the voltage at the non-inverting input of the amplifier 36 until it "overtakes" the voltage at the inverting input, at which point the amplifier 36 switches the heater charging circuit on via the SCR 42 and relay 44.

As can be seen from FIG. 2a, varying the temperature setting by adjusting resistor 58 effectively alters the switch-on time of the heater charging circuit with the result that the temperature attained by the storage medium at the end of the "off peak" period is also altered. (This does not, however, affect the rate of temperature increase of the storage medium). The temperatures A and B are respectively the storage medium temperature at the end of the "off peak" period for maximum and minimum temperature of the resistor 58 and, with a residual storage medium temperature of 200° C. at the beginning of the "off peak" period, the heater charging circuit is switched on at a time t1 for maximum temperature setting and time t2 for minimum temperature setting. Temperature C is the so-called "blown-down" temperature of the storage medium i.e. the fully discharged temperature. In the embodiment illustrated the counter 78 is a 7 storage counter requiring 128 input pulses to energise all its outputs. As shown, the last 5 outputs are used, providing 32 successive charges i.e. increments in voltage at the non-inverting input of the amplifier 64 between substantially 0 volt and +8.2 volt, with a +8.2 volt supply voltage. Each voltage increment takes place with each 4th input pulse. Preferably the value of the resistor 60 is such that the output of the amplifier 64 is at +6 volts with resistor 58 at its maximum setting, this potential being reached after the 22nd increment in the input voltage of the amplifier 64. For a proportioning period corresponding to an "off peak" period of 8 hours, that is for the full range of temperature settings provided by the system to be covered within the 8 hour period, the timing of the input pulses to the counter 78 is chosen to provide the appropriate number of voltage increments at the input of the amplifier 64 within the 8 hours. Thus 22 increments over 8 hours, with one increment every fourth input pulse, requires a spacing of approximately 300 seconds between the input pulses. Although these input pulses can be generated by means of an oscillator, it is preferable to use the second counter 92 to count mains voltage cycles. The counter 92 is a 14 stage counter, and with 50H supply provides an output pulse every 327·68 seconds. Thus each voltage increment at the input of the amplifier 64 is generated each 1310·72 seconds (approximately 22 minutes). The 22 steps therefore cover the 8 hour period, each step being of approximately 1.05 m V at the non-inverting input of the amplifier 36 and representing a 25° C. change in setting for a nickel chrome/nickel aluminium thermocouple.

Although the reference voltage is described as being effected in a stepwise manner it may equally be effected in a continuous manner by including suitable circuitry between the counter 78 or resistor 54 and the amplifier 64.

When the power supply to the system is disconnected capacitor 114, resistor 116 and diode 118 provide a resetting pulse to the counter 78 to reset its output at zero voltage.

The diodes 130, 132 and resistor 134 provide resetting pulses to the reset input 136 of the counter 92.

The control system of FIG. 1 also has the advantage that it can be set by suitable adjustment of the circuit variables to ensure that the storage medium attains its desired maximum temperature at approximately the end of the "off peak" period.

While the inclusion of the manually adjustable resistor 58 provides a user of the system with some degree of operator control it is to some extent a disadvantage in that the average user normally alters the temperature setting to a relatively high value at the onset of the autumn and winter months and does not thereafter readjust the setting regardless of the prevailing weather conditions. He may also tend to keep the setting at a higher level than is required during the summer months to anticipate cold spells which might occur from time to time, thus resulting in an unnecessarily high power consumption.

To obviate this disadvantage the system of FIG. 1 may be modified as shown in FIG. 3 by replacing the resistors 58 and 60 with a resistor chain consisting of two series resistors 120 and 122. The resistor 122 is a temperature dependent resistor exposed to outside temperature and automatically adjusts the desired temperature setting, i.e. heater charging circuit switch on time, according to the prevailing outside temperature.

FIG. 4 shows a further modification to the system of FIG. 1. As is described above and exmeplified in FIGS. 2a, 2b, and 2c, adjusting the value of the resistor 58 (or 122) alters the switch on time of the heater charging circuit within the chosen 8-hour proportioning period to provide the desired final storage medium temperature. However, once switched on, the heater charging circuit remains active during the remainder of the proportioning period, with the result that the overall consumer load on the national grid can become quite heavy towards the end of this period. It may therefore prove convenient or advantageous to spread the consumer load evenly over the whole of this period, and this is accomplished by modifying the system of FIG. 1 in accordance with FIG. 4.

Figure 5B:
Figure 5C:
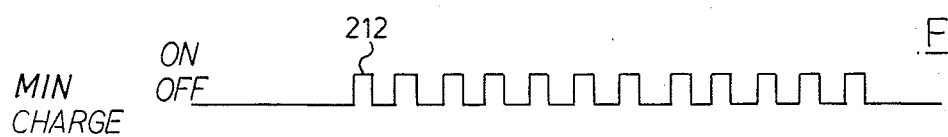

In FIG. 4 the resistor 66 is omitted and the resistor 58 is connected directly from the output of the amplifier 64 to the line 30. FIGS. 5a, 5b and 5c are similar to FIGS. 2a, 2b and 2c, illustrating the operation of the modified system of FIG. 1 again for both a maximum and minimum setting of the resistor 58.

As would be expected curves 208 and 210 for the maximum setting of the resistor 58 are identical with curves 200 and 204 of FIG. 2a (the residual storage medium temperature being the same in each case). However, adjusting the resistor 58 from its maximum setting reduces the overall slope of the stepped curve 210 by reducing the amplitudes of the voltage increments, applied to the non-inverting input of the amplifier 36, without affecting the rate of temperature increase of the storage medium. The result is that the SCR 42, and hence the heater charging circuit, is alternately switched on and off as first the voltage at the non-inverting input of the amplifier 36 steps above its inverting input voltage, and then the latter voltage rises above the former as the storage medium heats up.

FIG. 5c shows the on-off cycle of the heater charging circuit after the initial switch on for the minimum temperature setting of the resistor 58. The leading and trailing edges of the pulses 212 correspond in time to the switch-on and switch-off points E and H on the combined curves 212 and 214. As FIGS. 5a and 5c clearly show, although there is a minimal variation in the initial switch-on time of the heater charging circuit, the use of the circuit of FIG. 4 in the system of FIG. 1 enables the consumer load to be spread over a much greater time period than does the system of FIG. 1 alone.

The circuit of FIG. 4 can, of course be modified to perform a similar function to that of FIG. 3, the resistor 120 being connected to the output of the amplifier 64.

Figure 6A:
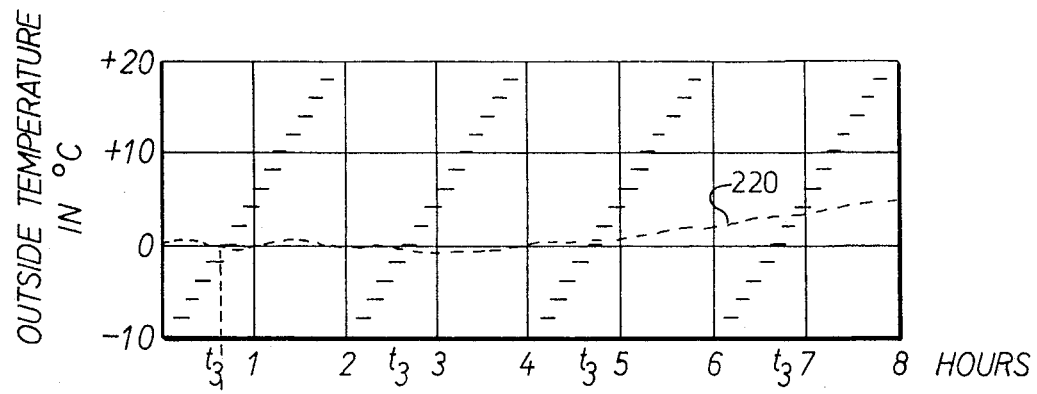
FIGS. 6a to 6d illustrate the operation of a still further modified form of the system of FIG. 1.

The system of FIG. 1 can be further modified to spread the consumer load over the "off peak" period by reducing the proportioning period and at the same time successively scanning the proportioning period during the "off peak" period. This can be achieved by reducing the time interval between successive steps of the reference voltage, and the operational results of such a modification are exemplified in FIG. 6a which shows four proportioning periods of 2 hours each being scanned in the "off peak" period. Each switch-on time t3 of the heater charging circuit is affected in this instance in dependence upon outside temperature, shown by curve 220, and the control system therefore incorporates the circuit of FIG. 3. However it is obvious that any of the above-described modified forms of the control system of FIG. 1 may be utilised.

To reduce the proportioning period, the resistor 134 and diodes 130, 132 are first removed from the system of FIG. 1 and the reset input 136 of the counter 90 is connected to the neutral line 30. This provides a maximum (greater than 11 hours) proportioning period generated by the counters 92 and 78. The resistor 66 is then adjusted in value and the resistor 90 reconnected to an earlier output stage of the counter 92 to give the required shorter proportioning period. The counters 92 and 78 then recycle through the proportioning period during the "off peak" period.

Figure 6B:

As can be seen from FIG. 6b which illustrates the on-off cycle of the heater charging circuit, the consumer load is spread over the whole of the "off peak" period, the leading and trailing edges of the waveform of FIG. 6b corresponding in time with the switch-on and switch-off times of the heater charging circuit.

Figure 6C:
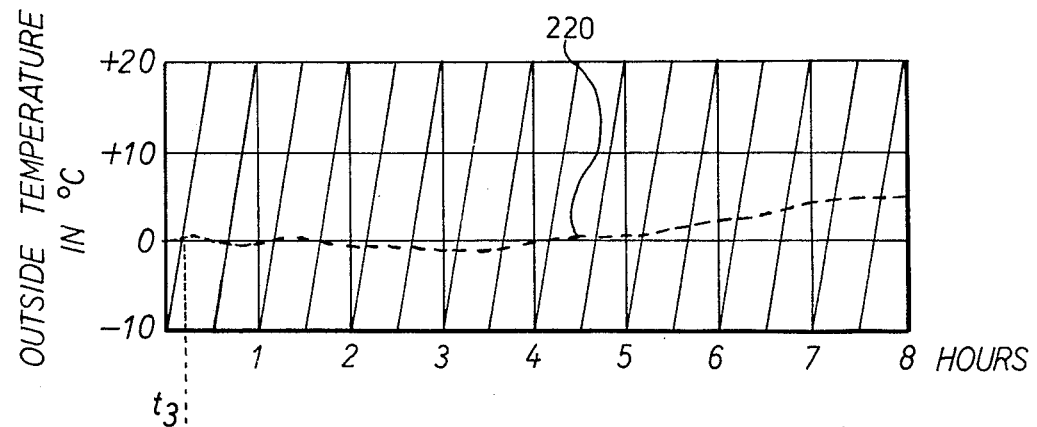
Figure 6D:
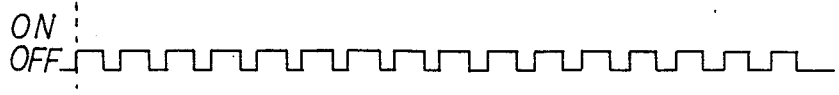

FIGS. 6c and 6d show the operational results of modifying the system of FIG. 1 to provide 16 proportioning periods during the 8 hour "off peak" period. As can be seen from FIG. 6d, this provides a considerably more even distribution of consumer load than does the provision of four proportioning periods.

Figure 7:
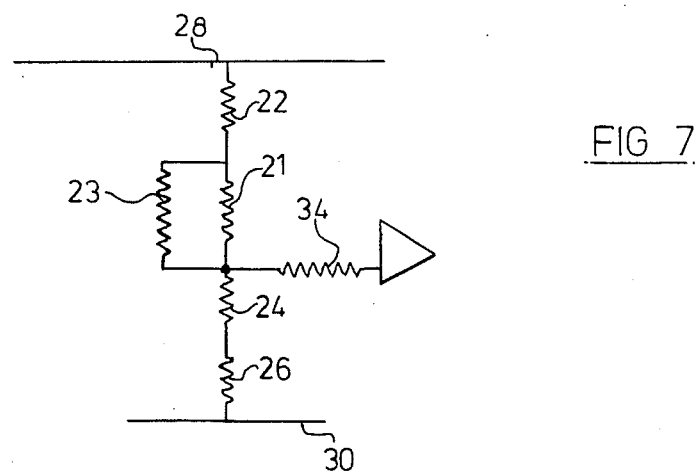
FIG. 7 is yet a further circuit modification for the system of FIG. 1.

It is intended that the "hot" junction 18a of the thermocouple 18 of the above-described systems be incorporated in the heater storage medium and this is of course most easily accomplished during heater manufacture. Where it is not possible to incorporate the thermocouple "hot" junction in the storage medium, for example in certain types of presently used heaters, the thermocouple 18 and resistor chain 22, 24 and 26 are altered to that shown in FIG. 7, the resistor 50 being omitted. Resistor 23 is a temperature dependent resistor which is located as close as possible to the heater storage medium and in thermal contact therewith. Resistor 21 ensures a more linear response with change in the temperature from the resistor 23.

The resistor 23 can alternatively by used to measure ambient temperature, the manual control resistor 58 then being included in the control system.

To facilitate selecting the particular form of control system required, and enable the operation to be varied in a simple manner, all of the above-described modifications may be incorporated in the one system and interconnections between the relevant components made by suitable means, e.g. push connectors.

I claim:

1. A control system comprising a sensor for monitoring a selected variable and providing an electrical signal which is a function of said variable; a reference source including an electronic timing circuit comprised of buffer means and a counting circuit having a plurality of outputs coupled by said buffer means to an output of the reference source and triggerable to progressively increase the output voltage of the buffer means to provide a reference signal at said output of the reference source which varies in a predetermined step-wise manner over a predetermined time period; and a comparator circuit coupled to said sensor and said reference source and operable to compare said electrical signal with said reference signal and provide a control signal in dependence upon the comparison.

2. A control system as claimed in claim 1 wherein the selected variable is the temperature of storage medium of a storage heater and the comparator circuit is arranged to control a charging circuit of the storage heater by means of said control signal.

3. A control system as claimed in claim 2 wherein the sensor is a thermocouple.

4. A control system as claimed in claim 1 wherein the timing circuit is operable to vary the reference signal in a continuous manner.

5. A control system as claimed in claim 1 further comprising means for deriving pulses from an alternating voltage supply and applying said pulses to the counting circuit to trigger the counting circuit.

6. A control system as claimed in claim 1 wherein the reference source includes control means for providing a further electrical signal and said reference signal is a function of said further electrical signal.

7. A control system as claimed in claim 6 wherein the control means is operable to vary the mean rate of increase of the reference signal.

8. A control system as claimed in claim 7 wherein the control means is operable to vary said mean rate of change by varying the height of each step of the reference signal.

9. A control system as claimed in claim 6 wherein the control means adjusts the level of the reference signal within a preset voltage range.

10. A control system as claimed in claim 8 wherein the control means is manually adjustable to vary said further electrical signal.

11. A control system as claimed in claim 10 wherein the control means is a potentiometer.

12. A control system as claimed in claim 9 wherein the control means is a second sensor for monitoring a second selected variable and providing said further electrical signal as a function of said second selected variable.

13. A control system as claimed in claim 12 wherein the second sensor is a temperature-dependent resistor.

14. A control system as claimed in claim 13 wherein the second selected variable is a function of outside ambient temperature.

15. A control system as claimed in claim 8 wherein the comparator circuit comprises comparator means having two inputs, the first of which is connected to the first sensor and the second of which is connected to said output of the voltage reference source, and wherein the comparator means is operable to generate said control signal in dependence upon the difference between electrical signals at its two inputs.

16. A control system as claimed in claim 15 wherein the comparator circuit further comprises switch means switchable from a first to a second switched state by the comparator means responsively to the reference signal exceeding the first-mentioned electrical signal.

17. A control system as claimed in claim 16 wherein said switch means is a silicon-controlled rectifier whose gate is coupled to the output of the comparator means to receive said control signal.

18. A control system as claimed in claim 17 wherein the switch means controls a relay solenoid.

19. A control system as claimed in claim 18 wherein said predetermined period is 8 hours.

20. A control system as claimed in claim 19 wherein the first-mentioned sensor is a thermocouple.

21. A storage heater having a control system as claimed in claim 20 wherein the first-mentioned selected variable is the temperature of storage medium of the heater and the comparator circuit is arranged to control a charging circuit of the storage heater by means of said control signal.

22. A control system as claimed in claim 13 wherein the comparator circuit comprises comparator means having two inputs, the first of which is connected to the first sensor and the second of which is connected to said output of the voltage reference source, and wherein the comparator means is operable to generate said control signal in dependence upon the difference between electrical signals at its two inputs.

23. A control system as claimed in claim 22 wherein the comparator circuit further comprises switch means switchable from a first to a second switched state by the comparator means responsively to the reference signal exceeding the first-mentioned electrical signal.

24. A control system as claimed in claim 23 wherein said switch means is a silicon-controlled rectifier whose gate is coupled to the output of the comparator means to receive said control signal.

25. A control system as claimed in claim 24 wherein the switch means controls a relay solenoid.

26. A control system as claimed in claim 25 wherein said predetermined period is 8 hours.

27. A control system as claimed in claim 24 wherein the first-mentioned sensor is a thermocouple.

28. A storage heater having a control system as claimed in claim 27 wherein the first-mentioned selected variable is the temperature of storage medium of the heater and the comparator circuit is arranged to control a charging circuit of the storage heater by means of said control signal.

* * * * *